United States Patent [19]
Ashworth et al.

[11] 3,824,707
[45] July 23, 1974

[54] APPARATUS FOR APPLYING SIMULATOR G-FORCES TO AN ARM OF AN AIRCRAFT SIMULATOR PILOT

[75] Inventors: Billy R. Ashworth, Newport News; John T. Merrill, IV, Yorktown, both of Va.

[73] Assignee: The United States of America as represented by the Administrator of the National Aeronautics and Space Administration, Washington, D.C.

[22] Filed: June 9, 1972

[21] Appl. No.: 261,183

[52] U.S. Cl. .............................................. 35/12 E
[51] Int. Cl. .............................................. G09b 9/00
[58] Field of Search...... 35/12 S, 12 E, 12 W, 12 D, 35/12 G, 12 P; 244/83 D

[56] References Cited
UNITED STATES PATENTS

| | | | |
|---|---|---|---|
| 2,521,680 | 9/1950 | Amtmann | 35/12 R |
| 2,851,795 | 9/1958 | Sherman | 35/12 S |
| 2,860,423 | 11/1958 | Dehmel | 35/12 S |
| 3,220,121 | 11/1965 | Cutler | 35/12 S |
| 3,529,365 | 9/1970 | Shelley | 35/12 S |

Primary Examiner—Robert W. Michell
Assistant Examiner—Vance Y. Hum
Attorney, Agent, or Firm—Howard J. Osborn; William H. King; John R. Manning

[57] ABSTRACT

This invention is a device to be used with an aircraft simulator to apply positive and negative g-forces to the pilot's arm. An arm harness fits around the the pilot's arm that he uses to operate the throttle. The device allows the harness to track intentional arm movements without exerting any restraining forces and at the same time applies through the harness g-forces to the pilot's arm that are computed by the aircraft simulator computer.

The invention described herein was made by employees of the United States Government and may be manufactured and used by or for the government for governmental purposes without the payment of any royalties thereon or therefor.

8 Claims, 3 Drawing Figures

APPARATUS FOR APPLYING SIMULATOR G-FORCES TO AN ARM OF AN AIRCRAFT SIMULATOR PILOT

BACKGROUND OF THE INVENTION

The invention relates generally to simulators and more specifically concerns a device for applying computed g-forces to a pilot's arm as he operates an aircraft simulator.

A pilot of an aircraft depends on "seat-of-the-pants feel" for control of the aircraft. That is, as the aircraft is being flown the pilot is subjected to g-forces that influence his movements in controlling the aircraft. In the past, the primary method used to supply the g-forces in aircraft simulators was to make the cockpits of the simulators movable. The main disadvantage of the movable cockpit is that the movement of the cockpit has a limited range which limits the effectiveness of the simulator. In addition, a large additional cost is added to the simulator when the cockpit is movable. Also, it is not easily adaptable for use with a visual scene in the simulator. The reason for this is that the cockpit moves relative to the scene unless the scene is made to move in unison with the cockpit.

It is the primary purpose of this invention to provide a simple, inexpensive device for applying computed g-forces to the arm of a simulator pilot for the purpose of simulating the feel of a pilot in a real aircraft.

SUMMARY OF THE INVENTION

The device that constitutes part of this invention is mounted on a movable cart that is attached to the throttle for movement therewith in the horizontal direction. The cart is level and moves on bearings to present negligible force to the throttle movement. The invention includes an arm harness for attaching to the simulator pilot's arm that controls the throttle. Signals representing computed values of g-forces are applied from the simulator computer to the device which converts these signals into forces that are applied through the arm harness to the pilot's arm. The device also allows the harness to track intentional arm movement in the vertical direction by the pilot without exerting any restraining forces with or without g-forces being applied to the pilot's arm through the harness. The cart allows the pilot to move his arm in the horizontal direction without exerting any restraining force. Hence, any intentional arm movement will be tracked with no change in g-force.

DETAILED DESCRIPTION OF THE INVENTION

Figure 1:
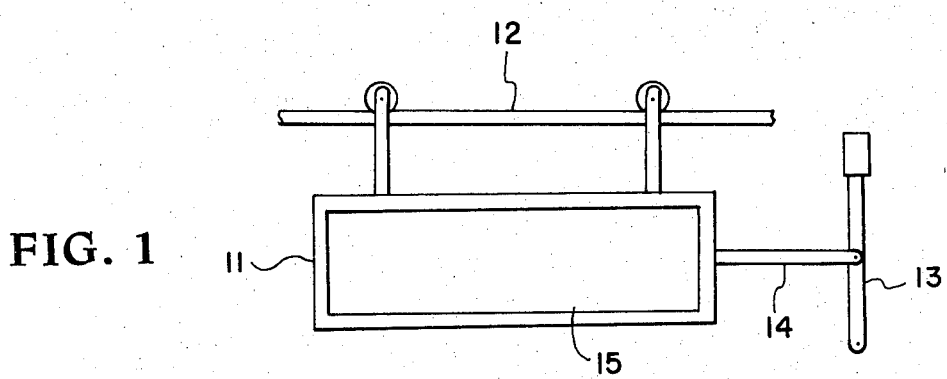
FIG. 1 is a schematic diagram showing how horizontal movement of the pilot's arm is accomplished.
Figure 2:
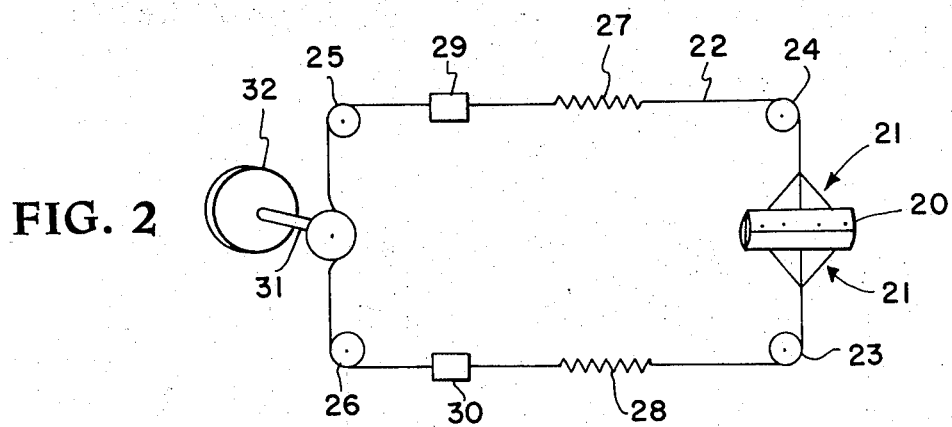
FIG. 2 is a schematic diagram of the mechanical components that enable the g-forces to be applied to the pilot's arm and that enable the pilot to move his arm in the vertical direction.
Figure 3:
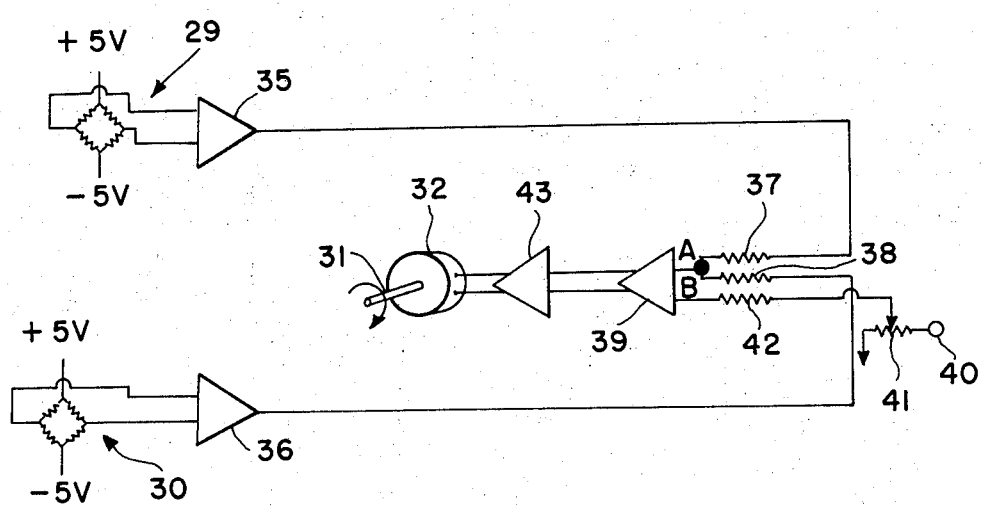
FIG. 3 is a schematic diagram of the electrical components that enable the g-forces to be applied to the pilot's arm and that enable the pilot to move his arm in the vertical direction.

Turning now to the embodiment of the invention selected for illustration in the drawings the number 11 in FIG. 1 designates a cart that is mounted for movement along a rail 12 in a horizontal direction. The throttle 13 of the aircraft simulator is attached to cart 11 by any suitable means 14 such that when the pilot of the simulator moves the throttle back and forth, cart 11 will move along rail 12. A device 15, which is disclosed in detail in FIGS. 2 and 3, is attached to cart 11 so that it moves with cart 11. This device 15 applies g-forces to the pilot's arm and enables him to move his arm in the vertical direction without exerting any restraining force.

The mechanical components of device 15 as shown in FIG. 2 includes an arm harness 20 which is approximately 6 inches long and fits on the pilot's arm about one inch above the wrist. The arm harness is elasticized to fit snugly on the pilot's arm. A three-wire support 21 is on each side of arm harness 20 to allow some rotational motion of the pilot's arm as well as providing more uniform forces. A cable 22 is attached to each of the three wire supports 21 and wrapped around a system of pulleys 23, 24, 25 and 26. Each of the pulleys is attached to cart 11 such that it will rotate relative to the cart. Cable 22 has preload springs 27 and 28, which can be rubber cords, for maintaining tension in the cable to avoid deadband in the system. The spring constant and amount of preload depends on the amount of force desired at the arm harness. Cable 22 is also attached to strain gages 29 and 30, and to the shaft 31 of a torque motor 32.

As shown in FIG. 3, strain gages 29 and 30 are simple bridge-type gages the outputs of which are applied to differential amplifiers 35 and 36, respectively. Differential amplifier 35 produces a positive output and differential amplifier 36 produces a negative output. The output of amplifier 35 is connected through a summing resistor 37 to input A of a differential amplifier 39, and the output of amplifier 36 is connected through a summing resistor 38 to input A of amplifier 39. The analog signals from the aircraft simulator computer representing the g-forces to be applied to the pilot's arm are applied to a terminal 40. These signals are applied to a potentiometer 41 the slider of which is connected through a resistor 42 to the input B of differential amplifier 39. The output of amplifier 39 is connected through a power amplifier 43 to torque motor 32.

In the operation of this invention, the computed g-force signals are applied to terminal 40 from the aircraft simulator computer. These g-force signals are applied through the slider of potentiometer 41, resistor 42, and amplifiers 39 and 43 to torque motor 32. The resulting torque produced by motor 32 are applied through cable 22 to apply forces to the pilot's arm through arm harness 20. The torque applied through cable 22 cause strain gages 29 and 30 to produce signals that are applied through resistors 37 and 38 to differential amplifier 39 to balance the system.

Whenever the pilot operates the throttle 13 his arm has both a horizontal movement and a vertical movement. The horizontal movement is taken care of by the movement of cart 11 along rail 12. The vertical movement, either up or down, is taken care of by the device in FIGS. 2 and 3 as follows. Assume that no g-force signal is applied to terminal 40 and assume that the pilot moves his arm up. Then amplifier 36 will increase its output due to the increased tension on strain gage 30 and amplifier 35 will decrease its output. Since amplifier 36 has a negative output and amplifier 35 has a positive output, point A becomes negative with respect to point B and motor 32 turns clockwise. Consequently, motor 32 moves the arm harness up to assume the new neutral position. Since motor 32 begins to turn as soon as the pilot starts his arm moving upward, the arm harness does not offer any resistance to the pilot's arm movement. If the pilot moves his arm down, point A becomes positive with respect to point B, motor 32 turns counterclockwise and the arm harness follows the pilot's movement. If g-force signals are applied to terminal 40 the corresponding g-forces will be applied through the arm harness to the pilot's arm and at the same time the arm harness will follow the intentional movement of the pilot's arm as described above.

The advantages of this invention are that it provides a simple, inexpensive means for applying simulated g-forces to a pilot's arm as he controls an aircraft simulator thereby providing a "seat-of-the-pants feel" for controlling the aircraft simulator.

It is to be understood that the form of the invention herewith shown and described is to be taken as a preferred embodiment. Various changes may be made without departing from the spirit and scope of the invention as described in the subjoined claims. For example, the pulley arrangement could be different from that shown and different electrical components could be substituted for those shown. Even though this invention is described as being used by the pilot as he operates the throttle of the aircraft simulator, it is obvious that it could be used with other control mechanisms such as the stick. Consequently, the claims in this application should not be limited to use with a throttle.

What is claimed is:

1. A device for applying simulator g-forces to the arm of an aircraft simulator pilot, g-forces being represented by input electrical signals, and for allowing a pilot to move his arm either up or down without exerting any restraining forces comprising:
    an arm harness which is adapted to fit around a pilot's arm;
    a system of pulleys fixed relative to said pilot;
    cable means attached to each side of said arm harness for forming a closed loop that is engaged with said system of pulleys such that a pilot can move his arm up or down;
    torque motor means engaging said closed loop cable means for exerting forces on said arm harness related to all electrical signals applied to said torque motor means;
    a first strain gage in said closed loop cable means between one side of said arm harness and said motor means;
    a second strain gage in said closed loop cable means between the other side of said arm harness and said motor means;
    each of said strain gages producing an electrical signal proportional to the strain in said cable at the location of the strain gage with the signal produced by the second strain gage being negative with respect to the signal produced by the first strain gage;

means for summing the electrical signals produced by said first and second strain gages; and
    means for applying to said torque motor means a signal representing the difference between said summed electrical signals and said input electrical signals whereby any time the input electrical signals changes the g-forces applied to a pilot's arm changes and any movement in the vertical direction will be followed by said torque motor means such that no restraining force is exerted by the arm harness.

2. A device according to claim 1 including a cart means attached to a control mechanism of the aircraft simulator and mounted for movement in a horizontal direction with said device fixed with respect to said cart whereby a pilot's arm can move in both a horizontal and a vertical direction as he operates the control mechanism.

3. Apparatus for applying simulated g-forces to the arm of an aircraft simulator pilot, g-forces being represented by input electrical signals, and for allowing the pilot to move his arm horizontally and vertically as he operates a control mechanism of an aircraft simulator without exerting any restraining forces comprising:
    cart means attached to the control mechanism of a aircraft simulator and mounted to move in a horizontal direction as the control mechanism is operated;
    an arm harness mounted on said cart means which is adapted to fit around a pilot's arm that he uses to operate the control mechanism; and
    means mounted on said cart means and attached to said arm harness receiving said electrical signals for applying g-forces to the arm of a pilot through said arm harness and for allowing a pilot to move his arm vertically as he operates the control mechanism of the simulator without exerting any restraining forces on the pilot's arm whereby a feel is developed for a pilot that enables him to better control the aircraft simulator.

4. Apparatus according to claim 3 wherein said means for applying g-forces to the arm of a pilot includes cable means attached to opposite sides of said arm harness to form a closed loop.

5. Apparatus according to claim 4 wherein said means for applying g-forces to the arm of a pilot includes a system of pulleys with said closed loop of said cable means fitted into the pulleys of said system of pulleys to support said arm harness.

6. Apparatus according to claim 5 wherein said means for applying g-forces to the arm of a pilot includes a torque motor with its shaft attached to said cable means to turn said closed loop in said system of pulleys.

7. Apparatus according to claim 6 wherein said means for applying g-forces to the arm of a pilot includes a first strain gage located in said closed loop cable means between said shaft and one side of said arm harness and a second strain gage located in said closed loop cable means between said shaft and the other side of said arm harness each of said strain gages producing an electrical signal proportional to the tension in said cable at its location the electrical signal of the second strain gage being negative with respect to the electrical signal of the first strain gage.

8. Apparatus according to claim 7 wherein said means for applying g-forces to the arm of a pilot includes means for summing the signals produced by said first and second strain gages, means for obtaining the difference between said summed signals and said input electrical signals and means for applying the resulting difference signals to said torque motor.

* * * * *